(12) United States Patent
Ponikiewski et al.

(10) Patent No.: US 10,670,080 B2
(45) Date of Patent: Jun. 2, 2020

(54) GROOVED SPLINED SHAFT WITH OVERMOULDING

(71) Applicant: TRW Steering Systems Poland Sp. Z.O.O., Czechowice-Dziedzice (PL)

(72) Inventors: Pawel Ponikiewski, Pewel Mala (PL); Artur Wojtalik, Katowice (PL); Slawomir Kwasny, Czechowice-Dziedzice (PL)

(73) Assignee: TRW Steering Systems Poland Sp. z o.o., Czechowice-Dziedzice ( * ) Notice: Subject to any disclaimer, the term of this patent is extended or adjusted under 35 U.S.C. 154(b) by 402 days.

(21) Appl. No.: 15/572,679

(22) PCT Filed: May 6, 2016

(86) PCT No.: PCT/EP2016/060203
§ 371 (c)(1),
(2) Date: Nov. 8, 2017

(87) PCT Pub. No.: WO2016/180730
PCT Pub. Date: Nov. 17, 2016

(65) Prior Publication Data
US 2018/0135703 A1 May 17, 2018

(30) Foreign Application Priority Data

May 8, 2015 (EP) ..................................... 15461532
Aug. 17, 2015 (GB) .................................. 1514613.7

(51) Int. Cl.
*F16D 1/10* (2006.01)
*F16D 3/06* (2006.01)
(Continued)

(52) U.S. Cl.
CPC .................. *F16D 1/10* (2013.01); *F16C 3/02* (2013.01); *F16C 3/03* (2013.01); *F16D 3/06* (2013.01);
(Continued)

(58) Field of Classification Search
CPC ..... F16D 3/03; F16D 3/06; F16D 1/02; F16D 1/06; F16D 1/10; F16D 1/12; B62D 1/185; F16C 13/00
See application file for complete search history.

(56) References Cited

U.S. PATENT DOCUMENTS

2017/0036690 A1* 2/2017 Jager ..................... B62D 1/185

FOREIGN PATENT DOCUMENTS

JP        S489458 Y1      3/1973
JP        2000240671 A    9/2000
(Continued)

OTHER PUBLICATIONS

Oka, Made in Australia, URL http://www.byles.net/www.oka4wd.com/forum/oka-maintenance/1432-front-drive-shaft?limitstart=0, Viewed on Jun. 2, 2016.
(Continued)

*Primary Examiner* — Daniel J Wiley
(74) *Attorney, Agent, or Firm* — MacMillian, Sobanski & Todd LLC

(57) ABSTRACT

A shaft having a splined portion comprises a first set of teeth with each tooth spaced radially at intervals about a first outer circumferential region of the shaft and a second set of teeth comprising an equal number of teeth to the first set that are also spaced radially at the same regular intervals about a second outer circumferential region of the shaft that is offset axially from the first region, with at least one tooth of the first set of teeth aligned with a corresponding tooth of the second set to form a pair in which the two teeth of the pair
(Continued)

together form an elongate spline; and wherein the first tooth and second tooth of each elongate spline are separated from each other in a direction parallel to the axis of the shaft by a groove that terminates at each end by a shoulder forming an end of a respective tooth, characterised in that each shoulder is tapered in a direction normal to the axis of the shaft and in that an overmolding is provided that comprises a portion that covers the teeth that is continuous with a portion that extends into the groove, the outer face of the overmoulding defining a plurality of teeth that each correspond to a respective underlying tooth of the shaft.

8 Claims, 4 Drawing Sheets

(51) Int. Cl.
  *F16C 3/03* (2006.01)
  *F16C 3/02* (2006.01)

(52) U.S. Cl.
  CPC ...... *F16C 2220/04* (2013.01); *F16C 2326/24* (2013.01); *F16D 2001/103* (2013.01); *F16D 2300/10* (2013.01)

(56) References Cited

FOREIGN PATENT DOCUMENTS

| | | |
|---|---|---|
| JP | 2001003947 A1 | 1/2001 |
| JP | 2010060002 A | 3/2010 |

OTHER PUBLICATIONS

GB Patents Act of 1977: Search Report Under Section 17(5), Application No. GB1514613.7, dated Feb. 9, 2016.
PCT International Search Report and Written Opinion, Application No. PCT/EP/2016/060203, dated Sep. 2, 2016.

\* cited by examiner

GROOVED SPLINED SHAFT WITH OVERMOULDING

CROSS-REFERENCE TO RELATED APPLICATIONS

This application is a national stage of International Application No. PCT/EP2016/060203, filed 6 May 2016, the disclosures of which are incorporated herein by reference in entirety, and which claimed priority to Great Britain Patent Application No. 1514613.7, filed 17 Aug. 2015, the disclosures of which are incorporated herein by reference in entirety, and Great Britain Patent Application No. 15461532.2, filed 8 May 2015, the disclosures of which are incorporated herein by reference in entirety.

BACKGROUND OF THE INVENTION

Splined shafts are well known and are often used to transfer torque from one shaft to another. A splined shaft comprises a shaft, and a set of splines or teeth spaced around an outer circumference of the shaft and in use is arranged such that its teeth are securely interlocked with the teeth of another object. The splined shaft is rotated and this rotational force is transferred to the toothed object through the engagement of the teeth.

In some instances it is advantageous for the teeth to be formed as part of the shaft, and for the teeth to be overmoulded with a continuous outer layer, typically of plastic, which can serve to provide a variety of advantages over an equivalent shaft which does not comprise an overmoulding. For example, an overmoulding can be made of a softer, more elastic, material relative to the harder material of the shaft and underlying teeth which can result in reduced noise from the transfer of torque through the splined portions. Alternatively a hard over moulding material may be used over a steel shaft and teeth and through the molding process the precise shape and size of the finished splined shaft can more readily be controlled compared with the machined shaft and teeth.

BRIEF SUMMARY OF THE INVENTION

According to a first aspect the invention provides a shaft comprising a splined portion which comprises a first set of teeth with each tooth spaced radially at intervals about a first outer circumferential region of the shaft and a second set of teeth comprising an equal number of teeth to the first set that are also spaced radially at the same regular intervals about a second outer circumferential region of the shaft that is offset axially from the first region, with at least one tooth of the first set of teeth aligned with a corresponding tooth of the second set to form a pair in which the two teeth of the pair together form an elongate spline; and wherein the first tooth and second tooth of each elongate spline are separated from each other in a direction parallel to the axis of the shaft by a groove the terminates at each end by a shoulder forming an end of a respective tooth, characterised in that each shoulder is tapered in a direction normal to the axis of the shaft and in that an overmolding is provided that comprises a portion that covers the teeth that is continuous with a portion that extends into the groove, the outer face of the overmoulding defining a plurality of teeth that each correspond to a respective underlying tooth of the shaft.

Every tooth of the first set may be aligned with a tooth of the second set to so that each tooth forms part of a pair defining an elongate spline.

At least one of the tapered shoulders, and optionally all of them, may comprise a first portion that extends from a tip of the tooth for a first distance along the shaft that reduces in distance from the axis of the shaft, a second portion that extends for a second distance along the shaft that reduces in distance from the axis at points that are further from the tooth, and a connecting region that joins the first and second portions.

The connecting region may comprise an abrupt step or a region that tapers at a greater rate than the first and second portions. Thus, the end of the first portion of the shoulder that is furthest from the associated tooth may be further from the axis of the shaft than the nearest end of the second portion is from the axis of the shaft.

The abrupt step may extend perpendicular to the axis of the shaft.

The first portion, and/or the second portion, may taper linearly or may taper in a nonlinear manner. Where linear, each portion may in cross section represent part of a truncated cone.

The provision of the grooves has been found to improve axial stability and retention of an overmoulding. The use of a groove that transitions into the teeth with a tapered shoulder aids retention of the overmoulding and has been found to reduces problems that may otherwise arise due to the effects of thermal expansion causing cracking of the molding.

By groove we mean a region where the distance from the axis of the shaft to the bottom surface of the groove is less than the distance from the axis of the shaft to the distal end of the teeth, i.e. to the top of the shoulders.

The groove may be located at the same distance from the axis of the shaft as the root of the teeth is located from the axis of the shaft.

The groove between each pair of teeth forming a spline may comprise a part of a single continuous land that extends around a complete circumference of the shaft.

The groove may pass between the pairs of teeth forming a spline at the same location axially along the shaft.

The land may have a uniform radius at all points around the shaft, or may be slightly higher between the pairs of teeth forming a spline than it in the regions where there are no teeth. Or it could be of a reduced radius in region between the pairs of teeth forming a spline compared with the remaining regions of the land.

Alternatively the groove that spaces a pair of teeth of one spline may be located at a different axial position along the shaft from the grooves that separate the teeth of the immediately adjacent splines.

In one preferred arrangement the grooves between splines may be located at one of two different axial positions to form a staggered pattern around the circumference of the shaft whereby a pair of teeth with a groove in the first axial position are neighbored by pairs of teeth with a groove in the second axial position.

This staggered pattern may provide a chequer board type pattern, the offset being equal to the axial length of each groove. Alternatively they may be axially offset by the length of each groove so that the grooves are not fully offset but are simply not aligned.

Each of these discrete grooves may have the same distance from the axis of the shaft, but they could all be slightly different.

The shaft may comprise a metal shaft. The overmolding may comprise a plastic material or an elastomer. The teeth under the overmoulding help locate the overmoulding and provide strength to the finished spline, bearing load transmitted through the overmoulding and transferring the load to the shaft.

The overmolding may be relatively thin where it covers the teeth, for instance the average thickness of the overmolded layer may be in the range 0.70 to 1.05 mm at the top of teeth and 0.55 mm to 0.75 mm in the valleys between the teeth.

The overmolding may be shaped so that the region of overmoulding that covers the groove or grooves may have the same outer profile as the region that covers the teeth, defining a continuous elongate spline shape from one end of the overmoulding to the other.

The length of the overmoulding may be substantially the same as the length of the spline defined by the pairs of teeth or slightly longer or shorter.

The splines may be located at regular intervals around the outer circumference of the shaft. But they may also be spaced at irregular intervals.

The flanks of the teeth forming each spline may intersect the flanks of the teeth of the adjacent splines, or there may be a gap between adjacent splines.

Other advantages of this invention will become apparent to those skilled in the art from the following detailed description of the preferred embodiments, when read in light of the accompanying drawings.

DETAILED DESCRIPTION OF THE INVENTION

Figure 1A:
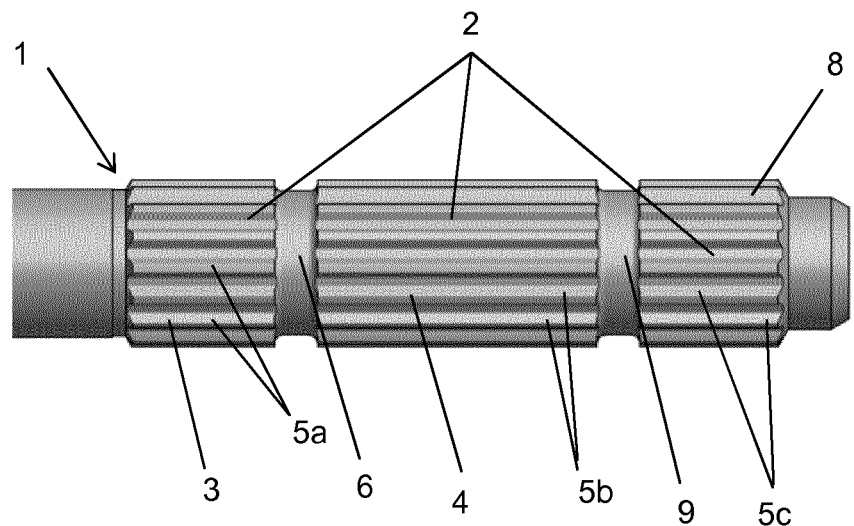
FIG. 1(a) shows a section of a known shaft comprising a splined portion.

FIG. 1(a) shows a section of a known shaft 1 comprising a splined portion 2. The splined portion comprises a first set of teeth 3 and a second set of teeth 4. These sets 3, 4 comprise an equal number of teeth 5a, 5b and the teeth 5a, 5b are in axial alignment with each other so that pairs of first and second teeth together form an elongate spline that covers a defined distance along the axis of the shaft. Both sets of teeth 3, 4 comprise teeth 5a, 5b which are spaced apart radially at regular intervals about the shaft 1. The teeth 5a, 5b are axially separated by a single continuous radial groove 6 which serves to allow an overmoulding 7 to remain in position. The groove 6 which separates the teeth 5a, 5b is at a sharp right angle to the teeth. The known shaft 1 of FIG. 1(a) also comprises a third set of teeth 8 comprising the same number of teeth 5c as the first and second sets 3, 4. These teeth 5c are in axial alignment with the teeth 5a, 5b of the first and second sets 3, 4. The third set of teeth 8 are separated from the second set 4 by another single continuous radial groove 9 which is also at a sharp right angle to the teeth 5b, 5c.

Figure 1B:
FIG. 1(b) shows the known shaft of FIG. 1(a) when covered with an overmoulding.

FIG. 1(b) shows the known embodiment of FIG. 1(a) after the addition of an overmoulding 7.

Figure 2A:
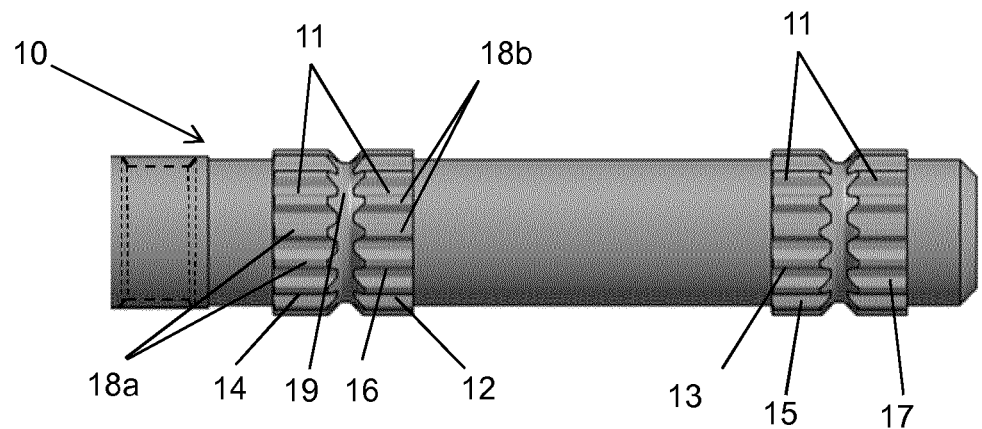
FIG. 2(a) shows a section of a shaft comprising a splined portion according to an embodiment of the present invention.

FIG. 2(a) shows a section of a shaft 10 comprising a splined portion 11 according to an embodiment of the present claimed invention. The splined shaft 10 can be used as a means of transferring rotational torque to a toothed object such as an internally splined female joint on the end of a shaft.

This particular embodiment comprises two splined portions 12, 13 along one shaft, though one, three or more are also envisaged.

The first splined portion 12 comprises a first set of teeth 14 and a second set of teeth 16. These sets 14, 16 comprise an equal number of teeth 18a, 18b and the teeth 18a, 18b are in axial alignment with each other to form pairs of first and second teeth that together define an elongate spline. Both sets 14, 16 comprise teeth 18a, 18b which are spaced apart radially at regular intervals about the shaft 10. The teeth 18a, 18b of the first and second sets 14, 16 are axially separated by a single continuous radial groove 19 that extends right around a complete circumference of the shaft.

Significantly, the groove 19 of the embodiment of FIG. 2(a) differs from that of the known arrangement of FIG. 1(a) in that the ends of the groove join the teeth at a shoulder which is tapered rather than at a sharp right angle to the teeth. This provides advantages over the prior art which will be discussed in relation to FIGS. 3, 4 and 5 below.

The second splined portion 13 is arranged in the same manner as the first splined portion 12, the second splined portion 13 having a first set of teeth 15 and a second set of teeth 17 separated by a tapered groove 9.

Figure 6A:
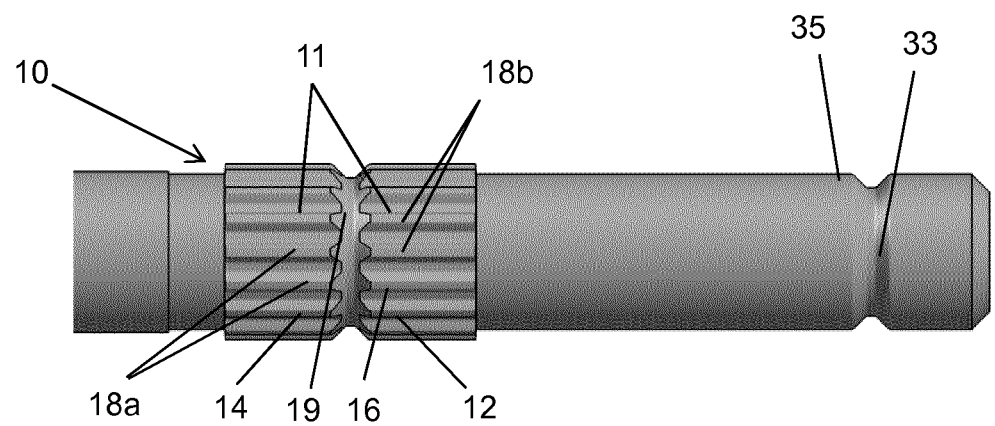
FIG. 6(a) shows an alternative to the second splined portion of the splined shaft of FIG. 2(a)
Figure 6B:
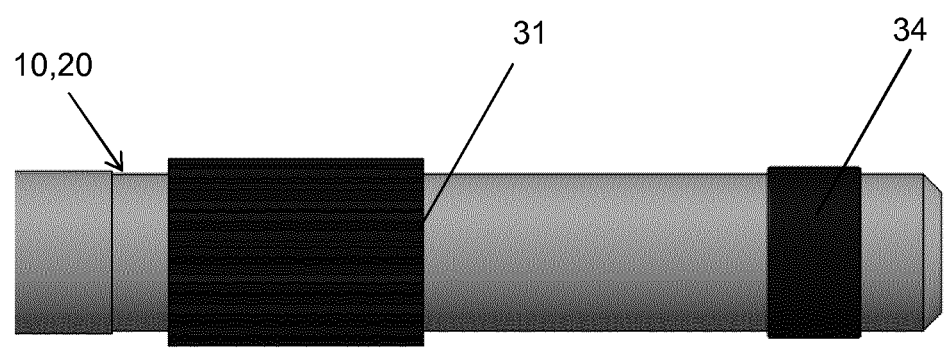
FIG. 6(b) shows the splined shaft of FIG. 6(a) when covered with an overmoulding.

Alternatively, as shown in FIGS. 6(a) and (b), the second splined portion 13 of FIG. 2(a) can be replaced with an unsplined portion 35 comprising a groove 33. The groove 33 can be covered with an overmoulding 34. In this arrangement the unsplined portion 35 can be used as a guide and when in use can contact a toothed object such as a gear wheel in such a manner that the splined portion 11 transfers torque to the toothed object when rotated but the unsplined portion 35 does not.

Figure 2B:
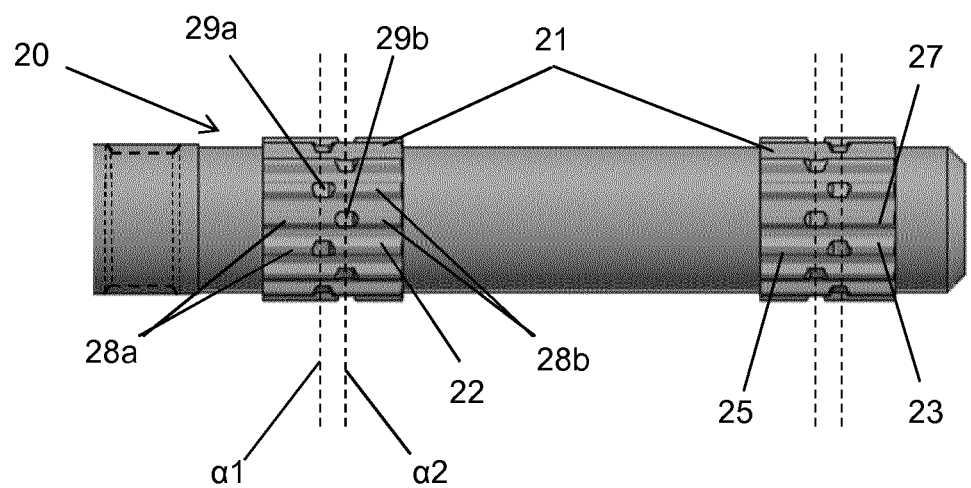
FIG. 2(b) shows a section of a shaft comprising a splined portion according to an alternative embodiment of the present invention.

FIG. 2(b) shows an alternative embodiment to that of FIG. 2(a). FIG. 2(b) shows a section of a shaft 20 comprising a splined portion 21 according to an embodiment of the present claimed invention. The splined shaft 20 can be used as a means of transferring rotational torque to a toothed object such as a gear wheel. Again many such arrangements are known in the art. This particular embodiment comprises two splined portions 22, 23, though one, three or more are also envisaged.

The first splined portion 22 comprises a first set of teeth 24 and a second set of teeth 26. These sets 24, 26 comprise an equal number of teeth 28a, 28b and the teeth 28a, 28b are in axial alignment. Both sets of teeth 24, 26 comprise teeth 28a, 28b which are spaced apart radially at regular intervals about the shaft 20. Each tooth 28a, 28b of the first and second sets of teeth 24, 26 is axially separated by a groove 29a, 29b. In this embodiment, unlike that of FIG. 2(a), the groove 29*a*, 29*b* comprises a set of discrete grooves 29*a*, 29*b* at a first and second axial position (as shown by lines α1 and α2). The axial position of each groove 29*a*, 29*b* alternates between the first axial position (α1) and the second axial position (α2) as you move around the circumference of the shaft from one spline to the next. Therefore splines formed from pairs of teeth 28*a*, 28*b* with a groove 29*a* in the first axial position (α1) are neighbored radially by splines formed from pairs of teeth 28*a*, 28*b* with a groove 29*b* in the second axial position (α2) and splines formed from pairs of teeth 28*a*, 28*b* with a groove 29*b* in the second axial position (α2) are neighbored radially by splines formed from pairs of teeth 28*a*, 28*b* with a groove 29*a* in the first axial position (α1).

Figure 2C:
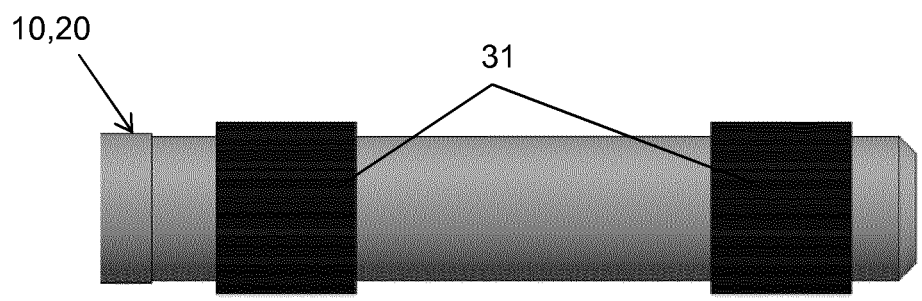
FIG. 2(c) shows a representation of the splined shafts of FIGS. 2(a) and 2(b) after the overmoulding has been added.

Significantly the groove 29*a*, 29*b* of the embodiment of FIG. 2(*b*) differs from that of the known arrangement of FIG. 1(*a*) in that it joins the teeth at a shoulder that is tapered rather than at a sharp right angle to the teeth. This provides advantages over the prior art which will be discussed in relation to FIGS. 3, 4 and 5 below.

The second splined portion 23 is arranged in the same manner as the first splined portion 22, the second splined portion 23 having a first set of teeth 25 and a second set of teeth 27.

FIG. 2(*c*) provides a representation of the splined shafts 10, 20 of embodiments of FIGS. 2(*a*) and 2(*b*) after the addition of an overmoulding 31.

Figure 3:
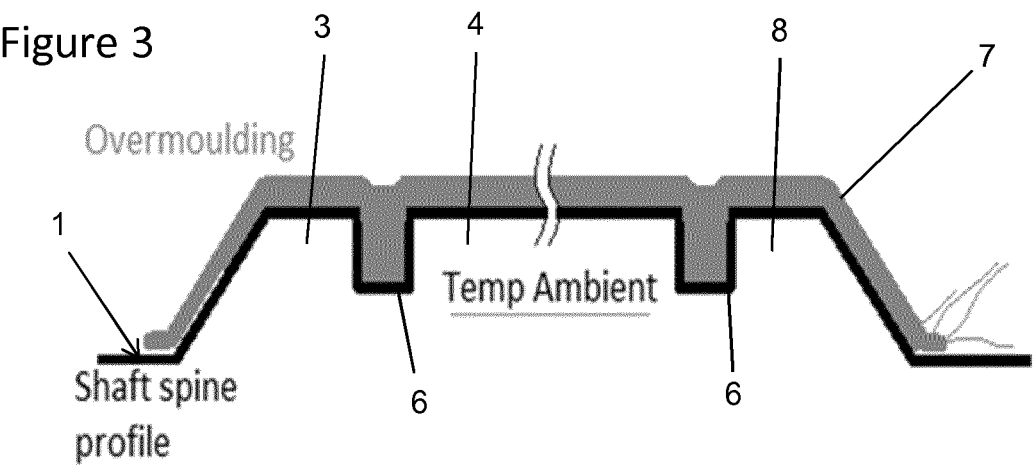
FIG. 3 shows a representation of an overmoulding on the known spline portion of FIG. 1(a) when at an ambient temperature.
Figure 4:
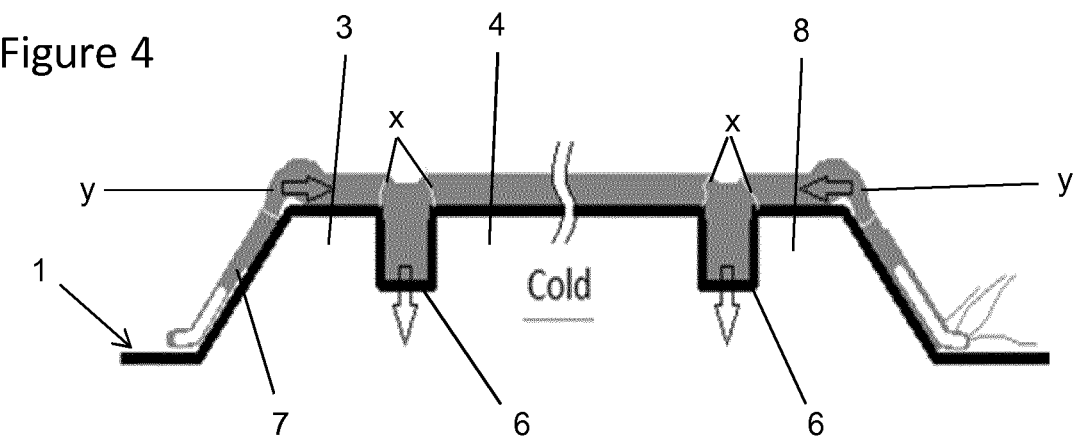
FIG. 4 shows a representation of an overmoulding on the known spline portion of FIG. 1(a) when at a low temperature.

FIGS. 3 and 4 show the arrangement of the overmoulding 7 on the known splined shaft 1 as shown in FIG. 1. The arrangement is shown at an ambient temperature in FIG. 3 and at a low temperature in FIG. 4.

At an ambient temperature it can be seen that the overmoulding 7 sits correctly and as anticipated, resting in the grooves 6, 9 of the splined portion 2 of the shaft 1. However as shown in FIG. 4, at colder temperatures the overmoulding 7 can shrink in both the axial and radial directions. With the known splined shaft 1 of FIG. 1 which comprises grooves with sharp right angles, this can lead to a variety of problems including cracking (x) of the overmoulding as well as deformation leading to the formation of a lip (y), as shown in FIG. 4.

Figure 5:
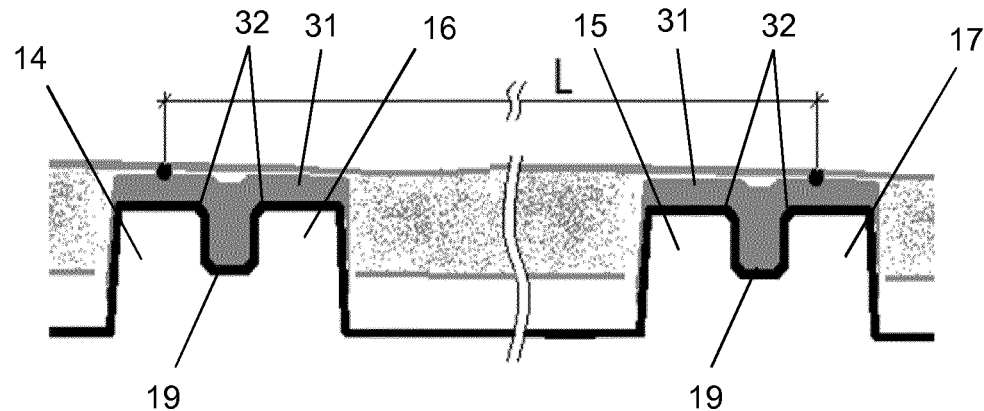
FIG. 5 shows a representation of an overmoulding on the spline portion of FIG. 2(a) when at a low temperature.

FIG. 5 shows an arrangement of the overmouldings 31 of the splined shaft 10 as shown in FIG. 2(*a*). As can be seen, the groove 19 in this arrangement tapers 32 and thus does not have the sharp edges of the equivalent groove 6 in the arrangement of FIG. 1. When cooled, it has been found that the overmoulding 31 does not crack or deform in the previously known arrangement. Therefore the life of the overmoulding 31 is extended considerably meaning less frequent maintenance is required.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A shaft having a splined portion which comprises a first set of teeth with each tooth spaced radially at intervals about a first outer circumferential region of the shaft and a second set of teeth comprising an equal number of teeth to the first set that are also spaced radially at the same regular intervals about a second outer circumferential region of the shaft that is offset axially from the first region, with at least one tooth of the first set of teeth aligned with a corresponding tooth of the second set to form a pair in which the two teeth of the pair together form an elongate spline; and wherein the first tooth and second tooth of each elongate spline are separated from each other in a direction parallel to the axis of the shaft by a groove that terminates at each end by a shoulder forming an end of a respective tooth, wherein each shoulder is tapered in a direction normal to an axis of the shaft and in that an overmolding is provided that comprises a portion that covers the teeth that is continuous with a portion that extends into the groove, an outer face of the overmolding defining a plurality of teeth that each correspond to a respective underlying tooth of the shaft;

wherein all of the first and second teeth are aligned in pairs to form elongate splines, and wherein the groove that spaces a pair of teeth of one spline is located at a different axial position along the shaft from the grooves that separate the teeth of the immediately adjacent splines.

2. The shaft according to claim 1 in which at least one of the tapered shoulders comprises a first portion that extends from a tip of the tooth for a first distance along the shaft that reduces in distance from the axis of the shaft, a second portion that extends for a second distance along the shaft that reduces in distance from the axis at points that are further from the tooth, and a connecting region that joins the first and second portions.

3. The shaft according to claim 2 in which the connecting region comprises an abrupt step or a region that tapers at a greater rate than the first and second portions.

4. The shaft according to claim 2 in which the first portion, and/or the second portion, taper linearly.

5. The shaft according to claim 1 in which all the first and second teeth are aligned in pairs to form elongate splines, in which the groove between each pair of teeth forming a spline comprises a part of a single continuous land that extends around a complete circumference of the shaft.

6. The shaft according to claim 1 in which the grooves between splines are located at one of two different axial positions to form a staggered pattern around the circumference of the shaft whereby a pair of teeth with a groove in the first axial position are neighboured by pairs of teeth with a groove in the second axial position.

7. The shaft according to claim 1 in which the splined portion is made of metal and the overmolding comprises a plastic material or an elastomer.

8. The shaft according to claim 1 in which the overmolding is shaped so that the region of overmolding that covers the groove or grooves has the same outer profile as the region that covers the teeth, defining a continuous elongate spline shape from one end of the overmolding to the other.

* * * * *